May 14, 1940.   D. L. CHANDLER ET AL   2,201,004
AUTOMOBILE DOOR WINDOW MECHANISM
Filed June 26, 1939   2 Sheets-Sheet 1

May 14, 1940.  D. L. CHANDLER ET AL  2,201,004
AUTOMOBILE DOOR WINDOW MECHANISM
Filed June 26, 1939   2 Sheets-Sheet 2
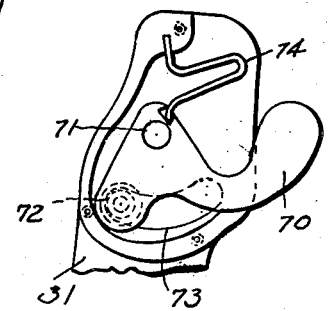
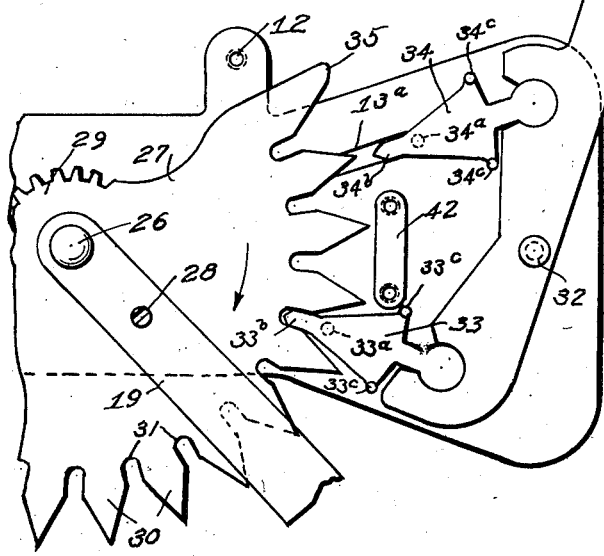
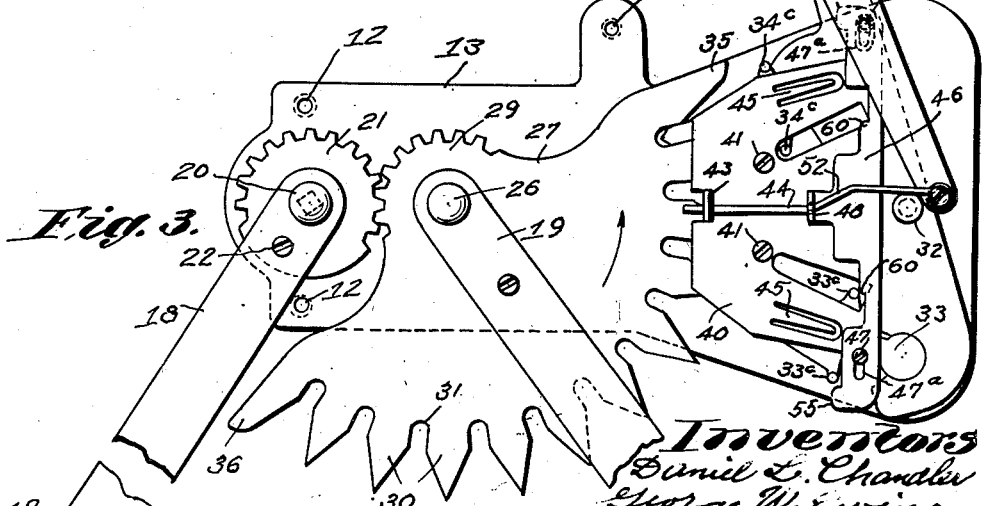

Patented May 14, 1940

2,201,004

UNITED STATES PATENT OFFICE 2,201,004

AUTOMOBILE DOOR WINDOW MECHANISM

Daniel L. Chandler, Salem, and George W. Ewing, Peabody, Mass., assignors to Aresee Company Inc., Salem, Mass., a corporation of Massachusetts Application June 26, 1939, Serial No. 281,146

4 Claims. (Cl. 268—126)

Our present invention relates to window elevating and control mechanism, and more particularly to automobile door window mechanism which raises and lowers the glass window pane.

In our present invention we have not only developed a very efficient apparatus which raises and lowers the window pane but it does so in a manner which provides a lock at every stage of the window pane movement so that it is impossible to slide the window pane down without operating the control mechanism in the manner in which it is designed to be used thereby reducing the possibility of theft to a minimum.

Another important feature involved in our invention is the fact that all of the parts comprising the apparatus, aside from a few standard screws, pins, etc., are formed from sheet metal which can be formed under the common punch-press methods which is so necessary for production purposes due to the elimination of expensive machining operations.

The principal object of our invention is an improved control mechanism for raising and lowering window panes;

Another object is an improved window pane lock for automobile door window panes;

Still another object is a window pane operating apparatus which raises and lowers the said window pane by means of a reciprocating lever located in the window sill of an automobile door or the like;

And still another object is a reciprocating operated lever having a reversing finger control adapted to reverse the direction of the window pane with either movement of the reciprocating member, and Other objects and novel feature comprising the construction and operation of our apparatus will be apparent as the construction is described further along in the specification.

In the accompanying drawings illustrating the preferred embodiment of my invention, Fig. 1 is a side elevation of the control apparatus attached to an automobile door window pane, as viewed from the inside of an automobile. The automobile door is partially outlined in dot-and-dash lines, no attempt being made to indicate the inside door frame to which the apparatus attaches;

Fig. 3 is a side elevation of the apparatus in exactly the same position as shown in Fig. 2 but with the reversing elements in their proper relationship for raising the window pane;

Figure 1:
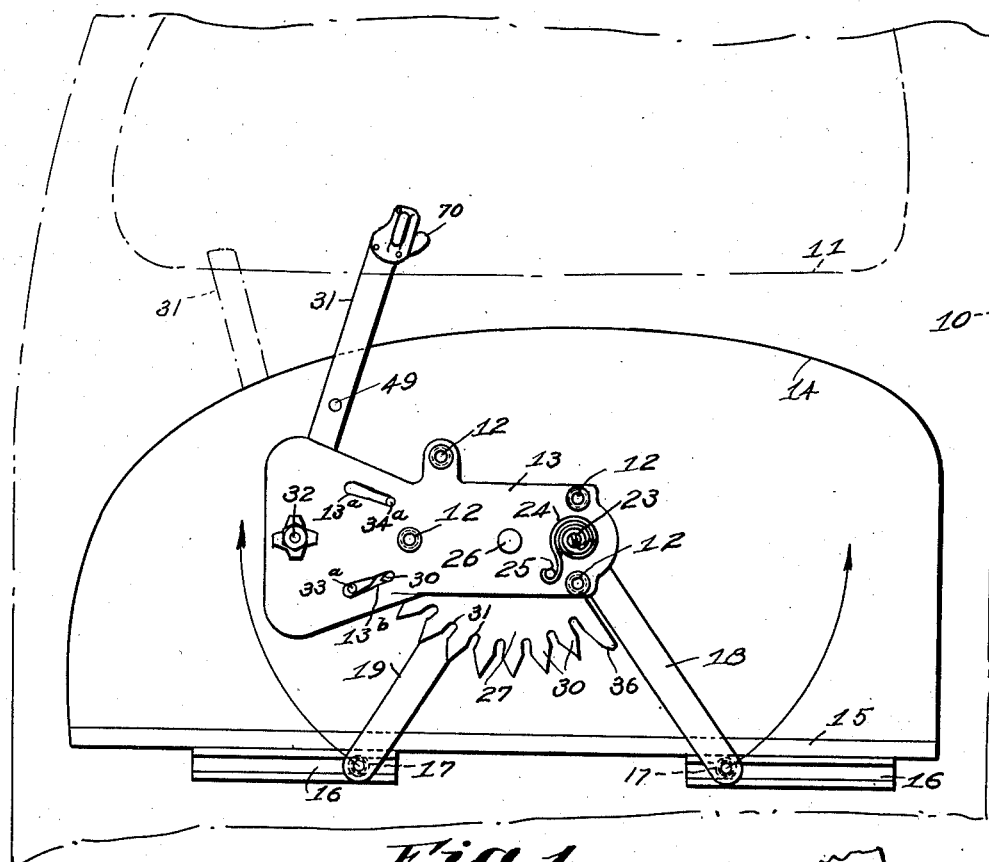
Figure 2:
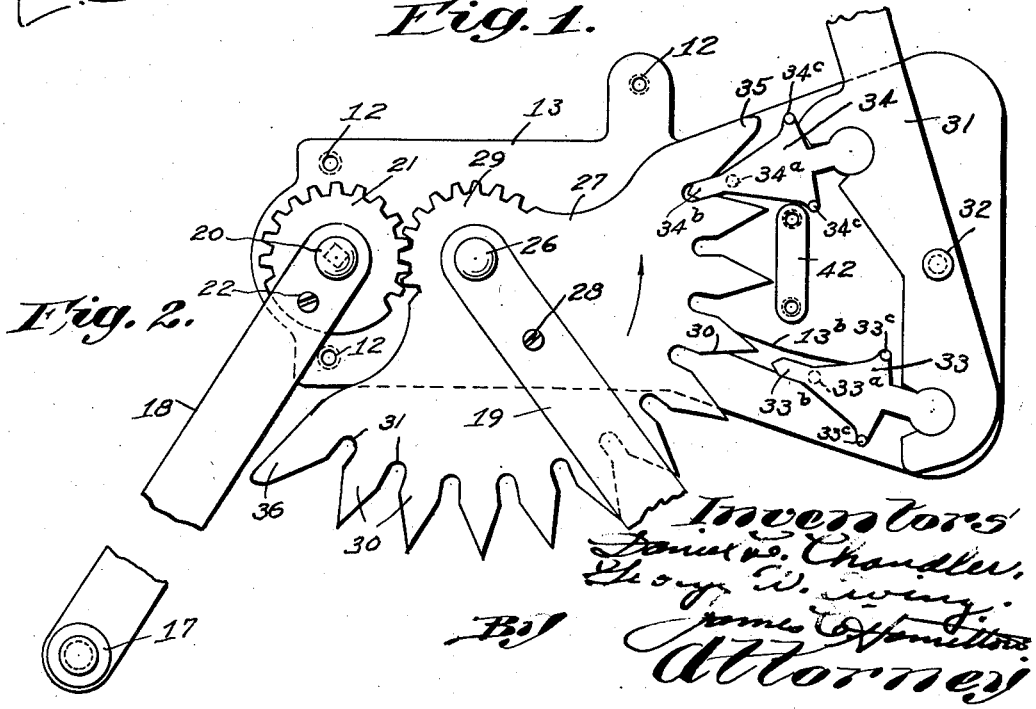
Fig. 2 is an enlarged scale side elevation, opposite to that shown in Fig. 1, and showing the raising and lowering mechanism in the proper position for raising the window pane. In this view, the reversing mechanism has been removed from the apparatus to better illustrate the means for operating the window pane arms.

Fig. 4 is a fragmentary side elevation similar to Fig. 2 but with the reciprocating lever moved to the left. In this view the reversing mechanism, which does not show in this view, has not been thrown to a reverse position so that the window pane arms are still moving upward, as in previous figures, and Fig. 5 shows a side elevation of the upper end of the reciprocating lever with the cover plate of the finger control lever removed showing the toggle means which operates the reversing lever. The position of this mechanism, as shown, is the same as shown in Fig. 1 which is the setting in which it assumes when the window pane arms are moving downward or at the end of such downward movement just prior to reversing the direction, as has been done in the other views.

Referring more in detail to the drawings, 10 indicates the frame of an automobile door having the usual window opening 11 both of which are indicated in dot-and-dash lines in the drawings.

Our window operating mechanism is mounted on the inner face of the inside metal frame, not shown, by means of screws which pass through the frame and engage in the threaded bosses 12 which are attached to the base plate 13, as shown in Fig. 1.

At 14 we have indicated the glass window pane which is shown in its lowermost position with respect to the door 10. The bottom edge of the window pane 14 is fitted with the usual channel member 15 to which is affixed lower channel members 16 within which operate roller members 17 which are fixed to the free ends of the control arms 18 and 19. The arm 18 is pivoted to the base plate 13 by means of the rivet 20. Between the arm 18 and the base plate 13 is positioned a pinion member 21 being anchored to the arm 18 by means of the screw 22 such that both the pinion 21 and the arm 18 operate as a unit with the rivet 20. The rivet 20 is preferably provided with a square body portion through the arm 18 and pinion 21 and a round body portion through the base plate 13. On the back side or end of the rivet member 20, as indicated at 23 we have provided a slot into which is tightly fitted a coil spring 24, the other end of which is anchored around the pin 25 fixed in the base plate 13.

When the arms 18 and 19 are in their lower position this spring 24 is wound up and provides a counterbalance for the weight of the window pane 14.

The arm 19 is pivoted to the base plate 13 by means of the rivet 26. Between the arm 19 and the base plate 13 is positioned a special segmental member 27 which is solidly connected to the arm 19 by means of the screw 28. The special segmental member 27 is provided with two segmental gears, the smaller having conventional teeth adapted to engage with the pinion gear teeth, as indicated at 29, the larger being specially designed teeth having their points formed in the shape of a spear point the sides comprising cam surfaces, as indicated by the numeral 30. Between the cam points 30 and at the base of said points are provided slots 31.

In Fig. 2, we have shown a reciprocating lever 31, the handle end being broken off. This lever 31 is pivoted at 32 to the base plate 13 and has journalled therein triangle-shaped members 33 and 34. The members 33 and 34 are provided on their back sides with pins 33a and 34a which engage through slots 13a and 13b in the base plate 13. It will be noted that the slots 13a and 13b are wider adjacent the ends nearest the reciprocating lever so that the members 33 and 34 can swing in their respective journals in the reciprocating lever when the members 33 and 34 are in their receded position, as in the present instance with 33. The forward ends 33b and 34b are pointed to form cam-like ends and are adapted to engage the cam sides of the members 30.

In the position shown in the illustration of Fig. 2, the member 33 is about to engage with the adjacent segment tooth member 30 when the lever 31 is swung to the right. As this lever 31 is swung to the right, the point 33b on the member 33 engages the lower side of the adjacent tooth 30 and a continuation of the movement forces the member 33 by means of the pin 33a and base plate slot 13b into the position shown in Fig. 4 thereby turning the segmental member 27 upwardly the distance of one-half of the center-to-center distance between the tooth 30.

When the point 33b of the member 33, or the point 34b of the member 34 is in the slot 31 between the teeth 30 in the segmental member 27 which is always the case at either the right or left movement of the lever 31, it is impossible to move the window pane 14 either up or down thereby providing an efficient window lock.

On the next movement of the lever 31 which will be to the left the member 34, as now shown in the position indicated in Fig. 4 engages its end 34b with the under side of the adjacent tooth 30 and the segmental member again moves upward. This process is continued until the window pane has reached its uppermost position. The segmental member 27 is prevented from movement in either direction beyond the last tooth 35 and 36. These special teeth are provided with extra long points with long curved ends so that a further movement of the members 33 or 34 cannot contact the outer cam sides thereby preventing the mechanism from becoming inoperative by losing contact with either member 33 or 34 as otherwise might be the case.

In the above description, the segmental member 27 has been operating in an upward or counter-clockwise direction, as shown in Figs. 2, 3 and 4 due to the fact that the direction control or reversing mechanism has been set for such movement.

In Fig. 3, we have shown a complete assembly of the apparatus which includes the reversing mechanism not previously described but which will now be described in detail.

It should be borne in mind that all of the structure except pins, screws etc. are constructed from sheet metal.

Over the journalled members 33 and 34 and a portion of the reciprocating lever and engaged teeth 30 there is provided a thin sheet metal plate 40, as shown in Fig. 3. This plate 40 is mounted on the base plate 13 by means of the screws 41, a spacing member 42 separating the plate 40 from the base plate 13 to provide clearance for the members 30, 33, 34 and 31. The plate 40 is flat except for a right-angled upturned bearing portion 43 which is adapted to receive the cam spring wire 44 and depressed flat spring portion 45 which bear against the members 33 and 34. A cam slide member 46 is slidably attached to the plate 40 by means of screws 47 adapted to operate in the elongated slots 47a provided in the slide 46. An upturned member 48 is provided on the slide 46 which provides another bearing for the spring wire 44.

Pivoted to the reciprocating lever 31, at 49, is a reversing lever 50 the lower end of which is provided with a pivot screw 51 around which is bent the end of the cam wire spring member 44. It will be noted that the wire member 44 is provided with an offset portion 52 midway of its length. This offset wire portion acts as a cam when the reversing lever 50 is pivoted on the reciprocating lever 31. When the reversing lever 50 is pivoted on the pivot 49, the wire cam member 44 slides through the upturned member 48 on the slide 46 and moves the slide 46 up or down as the case may be.

On the members 33 and 34 are upstanding pins 33c and 34c. These pins extend upwardly to a point slightly above the upper face of the slide 46 and are engaged by the cam projections 55 and 60 on the slide. Whichever of the members 33 or 34 are in the back position when this slide is operated will be contacted by either the cam 55 or 60 on the same end of the slide, and if the reversing lever 50 has been shifted, the contacting member either 33 or 34 will swing slightly so that its cam pointed end 33b or 34b will engage the other side of the segmental tooth 30 and the movement of the segmental member 27 will be reversed thereby changing the direction of movement of the window pane 14.

The reversing lever is controlled from the top of the reciprocating lever 31 by means of a toggle lever 70 which is pivoted to the lever 31 by means of the pin 71. A pin 72 also connected to the lever 70 extends through a radial slot 73 in the lever 31 and engages the upper end of the reversing lever 50. A toggle spring 74 is seated in the lever 31 and freely held at its other end in a keystone-shaped slot in the edge of the toggle lever 70 thereby maintaining the lever 70 in either right or left-hand position, as the case may be.

The lever 31 and reversing lever 50 extend a short way above the window sill on the inside of the glass, as shown in Fig. 1. The window is actuated up or down by means of the lever 31 and is always locked at any position of the window pane or any position of the lever 31. It is impossible to run the window pane 14 up or down without moving the lever 31 even if the lever 31 is left in a partially thrown position because the members 33 and 34 are never both out of engagement or clear of the teeth 30, so that they could be turned, at any time.

Having thus described our invention, what we claim as new is:

1. In combination with raising and lowering mechanism for automobile door windows, said raising and lowering mechanism comprising elevating arms attached to said window and engaged at one end by means of pivoted pinion members, one of said pinion members having an attached segment, V shaped teeth located on the periphery of said segment, alternating V shaped cam members engaging the V sides of said teeth for the purpose of elevating or lowering said window, slots located between said V teeth at their bases, said V shaped cams engaging with said slots at the end of each forward movement of the cams for the purpose of locking said segment and window.

2. In a raising and lowering mechanism for automobile windows, a segmental gear having V shaped teeth spaced apart by extended slots connected to said window, alternating cam actuating members engaging the V sides of said teeth for the purpose of rotating said gear, and progressively engaging in said slots for the purpose of locking said gear.

3. A door window locking raising and lowering mechanism comprising in combination, a base plate attached to the frame of said door, a sliding window pane having slideways attached to its lower edge, lifting arms slidably engaged in said slideways at one end and connected together by means of pinion gears at their other ends, said pinion gears being pivoted on said base plate, a segment member attached to one of said arms and provided with a plurality of radially disposed V shaped teeth formed in its outer periphery, said V shaped teeth being spaced apart by means of radially disposed inwardly extended slots, an alternating lever pivoted to said base plate having pivoted V pointed cam members pivoted on opposite sides of the pivot point of said alternating lever, said V pointed cam members engaging the V sides of said V shaped teeth on said segment member for the purpose of rotating said segment and further engaging in said extended slots for the purpose of locking said segment, cam slots located in said base plate adjacent said V pointed cam members, pins located in said cam slots and attached to said V pointed cam members for the purpose of directing said V pointed members, a slidable reversing plate attached to said base over said V pointed cam members, pins fixed in the upper face of said V shaped cam members, cam surfaces located on said reversing plate alternately engaging said pins on the upper sides of said V shaped members for the purpose of setting said V shaped cam members in proper positions, a reversing lever pivoted to said alternating lever, a cam spring connecting said reversing lever and said reversing slide for the purpose of positioning said slide.

4. In door window pane operating and locking mechanism, a segment pivoted in said door and connected with said window pane, a lever pivoted in said door and having pivoted fingers, said fingers having V pointed cam surfaces, V shaped teeth located on the periphery of said segment and spaced apart by radial slots, said pivoted fingers located on each side of said lever pivot, the cam end of said fingers engaging the V side of said V shaped teeth and into said slot in an alternating and progressive sequence with relation to the movement of said pivoted lever, the engagement of the cam end of said fingers with the V sides of said teeth for the purpose of rotating said segment and the engagement in the said radial slots for the purpose of locking said segment against further rotation.

DANIEL L. CHANDLER.
GEORGE W. EWING.